United States Patent
Sharma et al.

(10) Patent No.: US 7,085,004 B2
(45) Date of Patent: Aug. 1, 2006

(54) CALIBRATION SYSTEM FOR DOCUMENT PROCESSING SYSTEM INCLUDING VISUAL LAYOUT VALIDATION FOR TARGET MEASUREMENTS

(75) Inventors: Gaurav Sharma, Webster, NY (US); Thyagarajan Balasubramanian, Webster, NY (US)

(73) Assignee: Xerox Corporation, Stamford, CT (US)

( * ) Notice: Subject to any disclaimer, the term of this patent is extended or adjusted under 35 U.S.C. 154(b) by 908 days.

(21) Appl. No.: 09/725,998

(22) Filed: Nov. 29, 2000

(65) Prior Publication Data

US 2002/0065843 A1 May 30, 2002

(51) Int. Cl.
*G06F 15/00* (2006.01)
*G06K 1/00* (2006.01)

(52) U.S. Cl. ............... 358/1.9; 358/2.1; 358/504; 358/106; 358/3.23; 358/1.5; 382/167

(58) Field of Classification Search ........... 358/504, 358/406, 1.9, 1.14, 3, 23, 1.6, 1.15, 2.1, 3.23; 382/167, 162; 702/85
See application file for complete search history.

(56) References Cited

U.S. PATENT DOCUMENTS

| | | | |
|---|---|---|---|
| 5,818,960 A * | 10/1998 | Gregory et al. | |
| 6,141,120 A * | 10/2000 | Falk | |
| 6,381,037 B1 * | 4/2002 | Balasubramanian et al. | |
| 6,441,923 B1 * | 8/2002 | Balasubramanian et al. | |
| 6,671,067 B1 * | 12/2003 | Adam et al. | |

* cited by examiner

*Primary Examiner*—Kimberly Williams
*Assistant Examiner*—Satwant Singh
(74) *Attorney, Agent, or Firm*—Fay, Sharpe, Fagan, Minnich & McKee, LLP

(57) ABSTRACT

A method and system validates an output used in calibrating a document processing system (DPS). The calibration target is generated for assessing the range of outputs of the DPS. The target comprises a plurality of target elements and element orientation information representing a physical layout of the target elements in a DPS output. The DPS output is generated in accordance with the calibration target. The characteristic values of the DPS output are measured corresponding to the individual target elements. If a mis-ordering of the measurements of the target elements is identified, the measurements of the target element of the DPS are reordered in accordance with the desired order for computing an appropriate calibration function without requirement of re-measurement.

31 Claims, 6 Drawing Sheets

CALIBRATION SYSTEM FOR DOCUMENT PROCESSING SYSTEM INCLUDING VISUAL LAYOUT VALIDATION FOR TARGET MEASUREMENTS

FIELD OF THE INVENTION

The subject invention pertains to the field of imaging systems, and in particular a system for calibrating an imaging system with reference to a predetermined target wherein system output based upon the target can be utilized for computing a calibrating function. When measurement of the output for purposes of computing the calibrating function indicates a mismatch between a system output and a predetermined target, instead of re-measuring the output, the output is reordered in accordance with operator guidance, or automatically by minimizing a comparison error, so that the measured output can be effectively used for the calibrating function computation.

BACKGROUND OF THE INVENTION

Image or document information, as is commonly communicated through a network or internet system, is ultimately appreciated by system users through electronic display or physical printing of the document onto a piece of paper by a marking engine like a printer. The spacing of such devices over large networks presents a need for accuracy and consistency in the device operation. Accordingly, the calibrating of such devices, especially for color imaging, is a regular occurrence. The subject invention is particularly directed to facilitating the calibrating processes for such devices, particularly printers.

Document Processing Systems ("DPS") refers to a set of devices that construct, produce, print, translate, store and archive documents and their constituent elements. Such devices include printers, scanners, fax machines, electronic libraries, and the like. The present invention addresses situations particularly relevant to printing systems and discusses them as the prime example of a DPS, but the present invention should not be construed to be limited to any such particular printing application. Any DPS is intended to benefit from the advantages of this invention.

A printer is typically calibrated by providing a preselected set of target input signals, e.g., a selected set of CMYK signal values, to be processed by the printer and generating outputs corresponding to the inputs. Measurement of the output colors is performed for determining the calibrating function of the DPS so that the input signals are appropriately adjusted for the DPS to output the precisely desired output colors. In other words, the characterization operation of a printer must be determined so that the appropriate mapping function is defined for converting the desired output color to an appropriate input signal. Such calibrating operations and function determinations are well known in the art, and need not be discussed in detail herein, except to note that the programmed software that executes the computation of the appropriate calibration function, requires accurate correspondence between the test target input signals, and the measured device output signals.

Prior art systems have several disadvantages. An incorrect ordering is detected only as a generic inconsistency in measurements and not specifically as an ordering error. For correction, the user is asked to make fresh measurements which is a time consuming and rather boring task. In a closely coupled environment, the possibility of mis-orientation on the measurement stage can be somewhat reduced by providing suitable control files and specific instructions for the users' measurement stage. In a more distributed environment (for example in providing color characterization services over the web), however, this level of support/documentation for a wide variety of color measurement instruments is rather difficult.

The problem addressed by this invention and commonly encountered in the calibration process, is that when a test output is generated for a color characterization/calibration process, the input signals are known, as well as how those input signals were converted and printed out on a piece of paper, precisely because the system controls the printout based upon the input signals. However, the measurement process is not known. The system cannot control how a user actually measures the system output, i.e., the orientation of the output document and which measurement algorithm was employed for the measurement process.

FIGS. 1(a)–1(h) and 2 illustrate an exemplary output document, comprised of a plurality of output elements 20 each corresponding to a different test target element of the input target, wherein eight possible different measurement orders are shown. The measurement process is usually automated by placing the output document onto a measurement platen 30 so that a measurement head 34 moves mechanically across the page to hit and measure the color of each output patch element. It is clear from the different measurement orders of FIG. 1, that the same set of output patches can be measured in many different orders, depending on the control exercised in the measurement stage. However, computation of the calibrating function requires an accurate correspondence between the particular order of printing and measuring. A mismatched correspondence precludes the calibrating software from computing whatsoever the calibrating function.

When an "incorrect" order of measurement is performed so that the calibrating function cannot be computed, prior art systems handled the problem by introducing integrity checks which detected the incorrect measurement order, and then required the operator to re-measure the output document, which, as noted above, would require additional work and time from the operator. The incorrect order of measurements typically resulted from the operator somehow "flipping" the output document to a mis-oriented position, or also when the application of the control algorithm utilized an incorrect order of measurement of the output patch elements.

The subject invention particularly obviates the re-measurement process even after an incorrect measurement order is performed, by taking advantage of the fact that all the appropriate data for computing the calibrating function is available. The incorrect order of measurement can be re-ordered into a correct order of measurement. The possible discrepancies between the orders of measurements can be expected by the characterization software, and the actual measurement order determined by different possible orientations of the target on the measurement stage and different possible control files defining the measurement order so that the determined order of measurements is correct. By considering the possible mis-orientations of the target and determining, either automatically, or visually, which one corresponds to the target, the invention allows the data to be reordered instead of requiring time-consuming and arduous re-measurements. Additionally, the chances of mis-orientation are reduced by providing methods for guiding the user in orienting the target at measurement time.

SUMMARY OF THE INVENTION

One aspect of the present invention is a method for calibrating a document processing system (DPS) comprising the steps of providing a target comprised of a plurality of target elements to the DPS. An output is generated from the DPS from the target. The output includes a plurality of output elements corresponding to the target elements. The DPS output is measured relative to the target for computing a calibrating function for the DPS. When the measuring indicates a mismatch between the target elements and the output elements, the output elements are reordered for matching the measured output elements to the target elements whereby the computing of the calibrating function can be done without having to re-measure the output elements.

Another aspect of the present invention is that the computing of the calibrating function includes an expectation of a predetermined value for the measuring of the target. The mismatch is indicated when the computing of the calibrating function exceeds a threshold error from the predetermined value. Such mismatch can occur relative to a sequential order of measuring target elements defined by the measuring step, or relative to position "flipping" of the DPS output from the provided target.

Another aspect of the present invention comprises determining a minimum error value in the computing of the calibrating function, and interpreting the minimum error value as indicative of a correct reordering of the measured output element data. The minimum error of value can be computed from a set of likely orderings of the output elements relative to the target elements.

Another aspect of the present invention is that the reordering can be performed semi-automatically or automatically. Correcting in a semi-automatic manner involves a visual validation by an operator of the output document orientation for the measurement stage or the measurement order for the output patch elements. Visual validation could comprise a presentation by the system of the likely possibilities of the orientation and order of measurements and selection by the operator. Automatic correction comprises determining an error value in the computing of the calibrating function. When the error exceeds some predetermined threshold, the system identifies a mismatch between the input target and the measured output. Possible reorderings of the measurement process are effected until a minimum error value is determined, which minimum error value is associated with the correct reordering. The calibrating function is then computed from the corrected reordering. The predetermined value associated with the target can be computed from a prior calibration of the printer or computed from a model for the printer.

An alternative aspect of the present invention is a calibration system which expedites the computing of the calibrating function by validating that the measurement stage is only accomplished with a correct ordering of the output relative to the input target. The method comprises providing the target to the DPS and associating the target with a corresponding measuring process. The output is generated by the DPS. The output is disposed to be measured in a selected position in a measuring device for the computing of the calibrating function. Prior to the measuring, a user of a DPS is provided with a visual representation of the corresponding measuring process including a desired position of the output for the measuring. The user validates the selected position of the output relative to the provided representation so that the output can be properly measured and the calibration function can be computed. The representation of the corresponding measuring process includes imaging for the user of a selected position of the disposed output that provides a measurement in the correct order with respect to the DPS calibration process. If several control files are stored on the measuring system, visual thumbnail representations corresponding to each of these control files are displayed and the user selects the thumbnail that matches the target to be measured and orients the target in the displayed orientation. The visual representation of the target provided to the user and the control commands for the measurement stage are generated concurrently with the target layout and preferably packaged together, possibly as a single control file within the operating software that can be used at the measurement stage.

The principal advantage of the subject invention is the avoidance of having to re-measure a DPS output for the computation of the calibrating function when an operator has incorrectly disposed the output for the measurement stage relative to what target input the DPS used to generate the output.

Another advantage of the subject invention is a system which facilitates the correct orientation and ordering of the measurement stage by preliminarily advising the operator, preferably by a visual indicator, of what the system expects the position and measurement order to be in order to properly execute the measurement stage.

Yet another advantage of the present invention is the correction of a mismatch in the computation of the calibrating function due to a flipping or shift in the measurement order of the control patches, either semi-automatically or automatically.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and are being illustrated for illustration purposes only and should not be limitative of the scope of the present invention, wherein.

DETAILED DESCRIPTION OF THE PRESENT INVENTION

The following is a detailed description of the invention and the supporting drawings for purposes of illustrating the preferred embodiments of the invention. Although alternatives are discussed, the detailed description is exemplary and not meant to be limiting to the scope of the invention or its equivalents.

Color characterization of a DPS is commonly performed as a two step process. In the first step, characterization software generates a target (e.g., FIG. 2) with a set of color patches specified in terms of DPS control values (e.g., CMYK signals) which can be printed or imaged on the DPS to be characterized. The printed target is then measured by a measurement stage. In the second step, the measured values are provided to the characterization software and the software uses the correspondence between the target control values and the DPS measured values to derive the DPS characterization profile. Such a profile can be a mapping or control function and for purposes of simplification, will hereinafter be referred to as the calibration function.

Since the target generated for printing is typically a two dimensional layout on one or more pages, the measurements for the target could be made with a number of different orientations of the target page(s) on a measurement stage and in a number of different orders for accessing the patches; for example, left to right across rows, moving among the rows from top to bottom; or top to bottom across the columns moving across columns from right to left, such as shown in FIG. 1(a)–1(h). However, in order for the characterization process to work, it is necessary that the characterization software knows which measurement corresponds to which set of device control values used in generating the target. In the past, this has been tackled by having a fixed measurement order that the characterization software requires—for instance, left to right across the rows and moving among rows from top to bottom when the target is held with (for instance) text in the target oriented upright (as in FIG. 2). If such a system, which assumes a fixed measurement order for the target patches, is fed measurements of the target made in an incorrect order, it would either result in a totally useless characterization, or if the software includes "integrity checks", the incorrect ordering is detected as a large deviation from expected printer behavior and the user is then required to make fresh measurements using the correct measurement order.

Automatic and Semi-Automatic Detection and Correction of Ordering Errors Produced by "Mis-Orientation"

Figure 3:
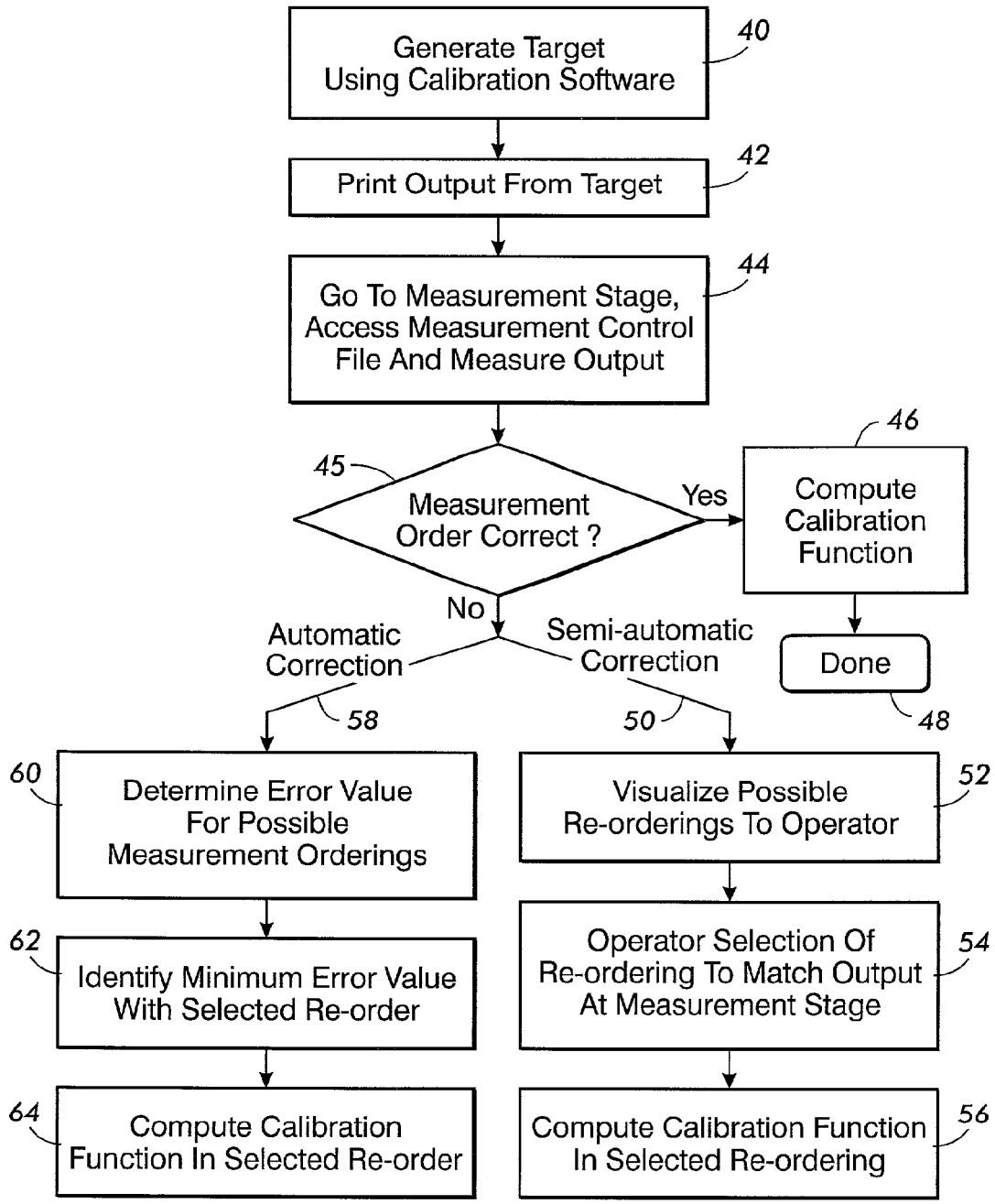
FIG. 3 is a flowchart illustrating the steps practiced for either an automatic or semi-automatic correction of the calibration process practiced in accordance with the present invention.

With reference to the flowchart of FIG. 3, the invention relies on the fact that one can recover from common "mis-orientations" of the target on the measurement stage through a process of reordering the measurements. The reordering may be guided either by a visual confirmation from a user or through an automatic correlation of the color measurements and the device control values.

Figure 1A:
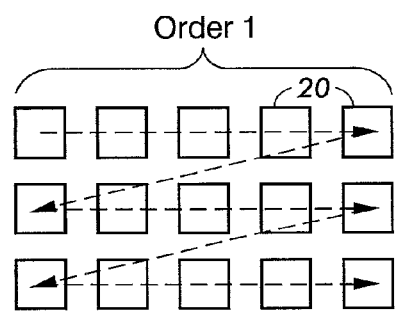
FIGS. 1(a)–1(h) illustrate alternative orientations and orders of measurement for a plurality of test patch outputs.
Figure 1B:
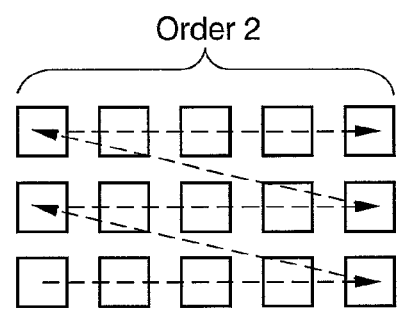
Figure 1C:
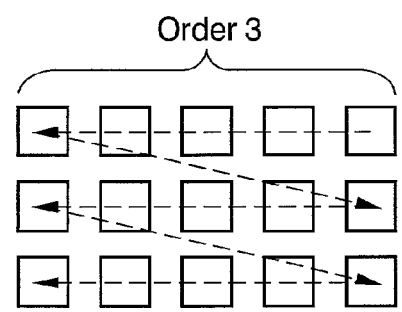
Figure 1D:
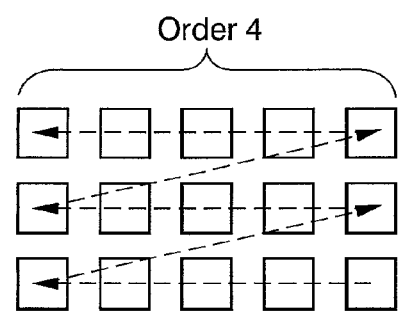
Figure 1E:
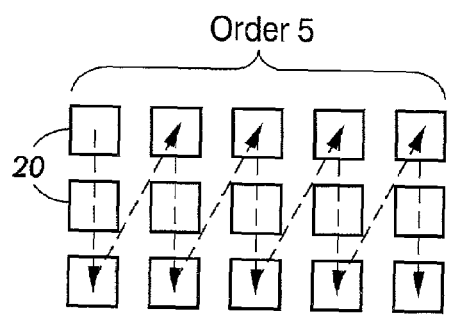
Figure 1F:
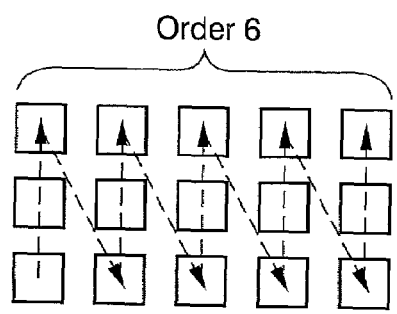
Figure 1G:
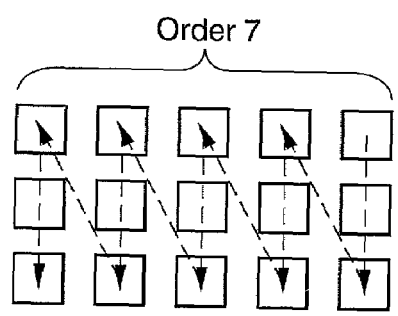
Figure 1H:
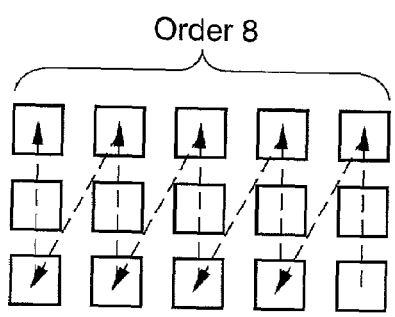
Figure 2:
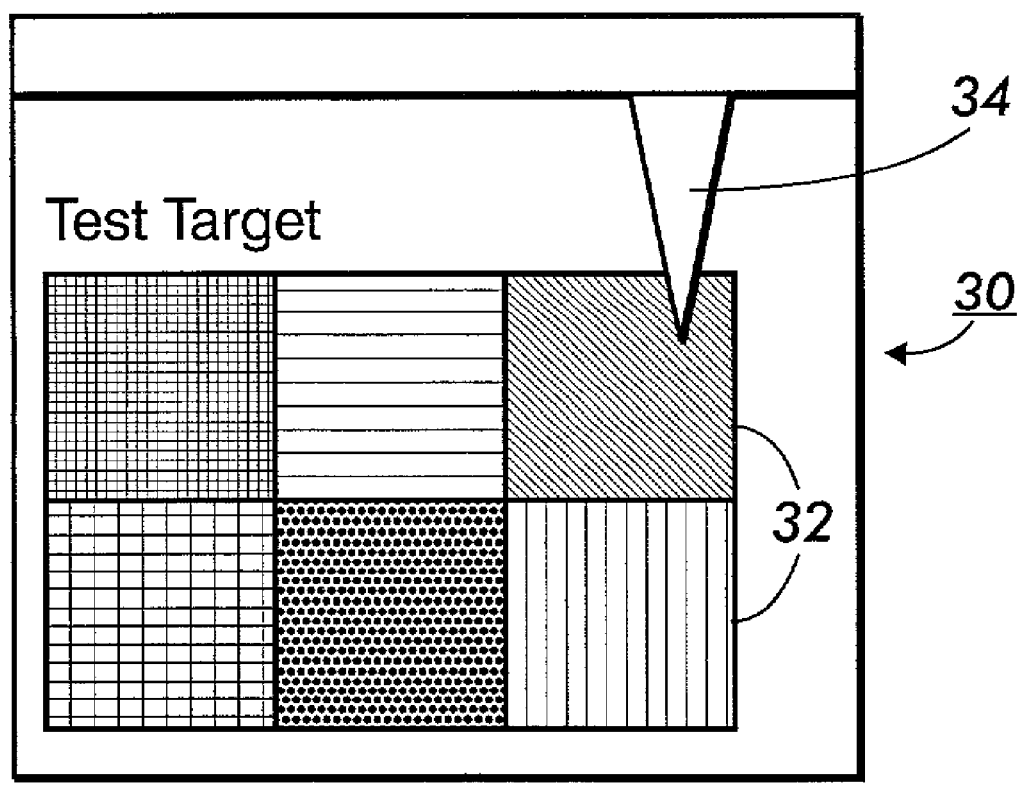
FIG. 2 is a schematic illustrating how a representation of a target can be used in a graphic/image to guide the placement of a target on a measurement stage.

In the following description it will be assumed that the calibration target is a single page comprised of several hundred test patches. For simplicity in explanation, only a few exemplary patches are shown in FIGS. 1 and 2. The method can however be readily generalized to multiple target pages by applying the same technique to each printed page and over pages (possibly by partitioning raw measurements into pages using the known number of patches per page from the target generation step and the reasonable assumption that measurements corresponding to a page are contiguous). Sample color characterization targets are shown in FIGS. 1(a)–(h) and can be measured by any of the orders shown therein.

The target is generated 40 by the calibration software so that the output patches when printed 42 are oriented along a rectangular grid (this is usually the case, though not a requirement) over the page. Typical automated color/spectral measurement stages 30 access 44 a measurement control file from the software and provide methods for readily measuring such targets by placing the target on the stage and then specifying, by means of the control file, a measurement sequence for the patches 32 as they appear on the stage (for example, left to right across rows, moving among the rows from top to bottom; or top to bottom across the columns moving across columns from right to left). The target orientation on the measurement stage could potentially be varied in several different ways by flipping/rotating the target and the measurement stage control file could vary the order in which the patches are measured. Due to these various degrees of freedom in the target placement and in the control files, there are several possible correspondences between the sequence of target color/spectral measurements and the physical placement of the target patches on the page. In existing systems, usually, only one of these correspondences is allowed as a correct one and others result in incorrect characterization or request a remeasurement by the user. In order to remedy this problem, the subject invention automatically determines the different potential correspondences and determines the one that is correct. For a rectangular target layout like the one shown in FIG. 1, it is highly likely that the target region of the page will be measured in one of the following eight orders (specified, for instance, when the target is oriented with the text upright, FIG. 2: (1) left-to-right across rows, moving among the rows from top to bottom; (2) left-to-right across rows, moving among the rows from bottom to top; (3) right-to-left across rows, moving among the rows from tope to bottom; (4) right-to-left across rows, moving among the rows from bottom to top; (5) top to bottom across the columns moving across columns from right to left; (6) bottom to top across the columns moving across columns from right to left; (7) top to bottom across the columns moving across columns from left to right; and (8) bottom to top across the columns moving across columns right to left. These measurement orders are shown graphically in FIG. 1. Note that additional orders, such as for example a serpentine scan, could be considered similarly.

If the measurement data is acquired from correctly corresponding data 45, then the calibration function can be computed 46 and the process is done 48. If not, the present invention provides for corrections without remeasurement.

In one embodiment of the invention (semi-automatic correction 50), the characterization/profiling software regenerates eight different rectangular-grids of patches having the same number of rows and columns as the calibration target (this is known since the target itself was generated by the characterization software). The colors of the patches in each of the grids are set by arranging the color/spectral measurements for the target patches in each of the above-mentioned eight measurement orders. The user is then presented 52 with these different rectangular-grids on a display and asked to pick the one whose orientation matches the orientation of the physical printed DPS output when it is held with the text upright (alternate methods may be used for specifying the orientation of the physical target if no text is present—for example, with the cyan wedge on top and with the most saturated cyan patch to the left). Once the user enters 54 the number of the rectangular-grid layout that matches the printed target, the correspondence between the physical target patches and the measurement data is unambiguously established. Since the physical target layout is generated by the characterization software, it can use this correspondence to obtain the correspondence between device control values and the measurement values for each of the target patches and the characterization can then be performed 56 using the measured data. For testing a large number of potential measurement orders (for instance with serpentine scans of the patches), multiple display screens of orientations may be used until the user indicates a match (organizing the most common "mis-orientations" in the earlier screens would make this more efficient). In addition, as a first step, instead of generating all rectangular-grids, a single rectangular-grid layout corresponding to a default assumed order that matches the physical target could be presented to the user asking him/her to visually check the layout with the physical target. The second step of generating and displaying all other rectangular grids may then be performed only if the user indicates that this order is incorrect. The system could also be set up so that visual verification is invoked only if the automatic integrity check indicates an error in target layout. (This allows the printer characterization to proceed with minimal user intervention unless a problem is encountered.)

In another embodiment of the invention (automatic correction 58), the process could be further automated by using some knowledge of the printer characteristics. For instance, if a profile model for the printer (or a similar class of printer) is available (e.g., from a previous calibration) the device control values used in generating the target can be used to determine expected color values for the target patches. These values can then be reordered to correspond to the measured values using each of the possible assumed measurement orders for the target patches. Color differences (e.g. an error value, $\Delta E$) between corresponding color values in these predictions and the actual measurements can then be computed 60 for each of the assumed measurement orders and these can be used to determine the most likely measurement order. For instance, the most likely measurement order may be determined as the case which yields 62 the smallest average (or some other statistic) color difference. Instead of arranging the predictions in different orders, equivalently, the measured target values could be arranged in different orders yielding the same (or almost the same, for asymmetric color differences) results. Note that the automated system can readily search through a much larger number of "mis-orientations" than one could reasonably present to a user for a visual check. The so determined correct order is then used 64 to compute the calibration function. Note that the invention is applicable even if there is no prior knowledge of the printer characteristics, but the calibration function is suitably constrained to model only reasonable devices. For instance, the calibration function may rely on a parametric device model or may have a functional form that precludes it for accurately representing jumbled data. In this case, the correct measurement order may simply be determined by a brute force approach that determines the calibration function for several possible measurement orders and selects the ordering based on the accuracy of the determined calibration function in representing the measured target patches.

In a third embodiment, the methods of the first and second embodiment could be combined with the average color difference being used to winnow down the number of orderings to a reasonably small set, and to determine the sequence of possible orderings to display (i.e., display the most probable ordering first, etc.) Finally, one of the layouts is selected by the user after a visual comparison to the physical target.

It is worth noting again, that the methods described here are particularly useful in a web-based (or other distributed) color profiling systems where there is little control over the user's measurement environment (which may also be hard to support given the diversity of measurement instruments). The color characteristics of monitors are fairly standardized and relatively easy calibration methods are available for monitors so the presentation of a target layout of the type of FIG. 3 can be done on the screen with fairly good color accuracy.

Figure 4:
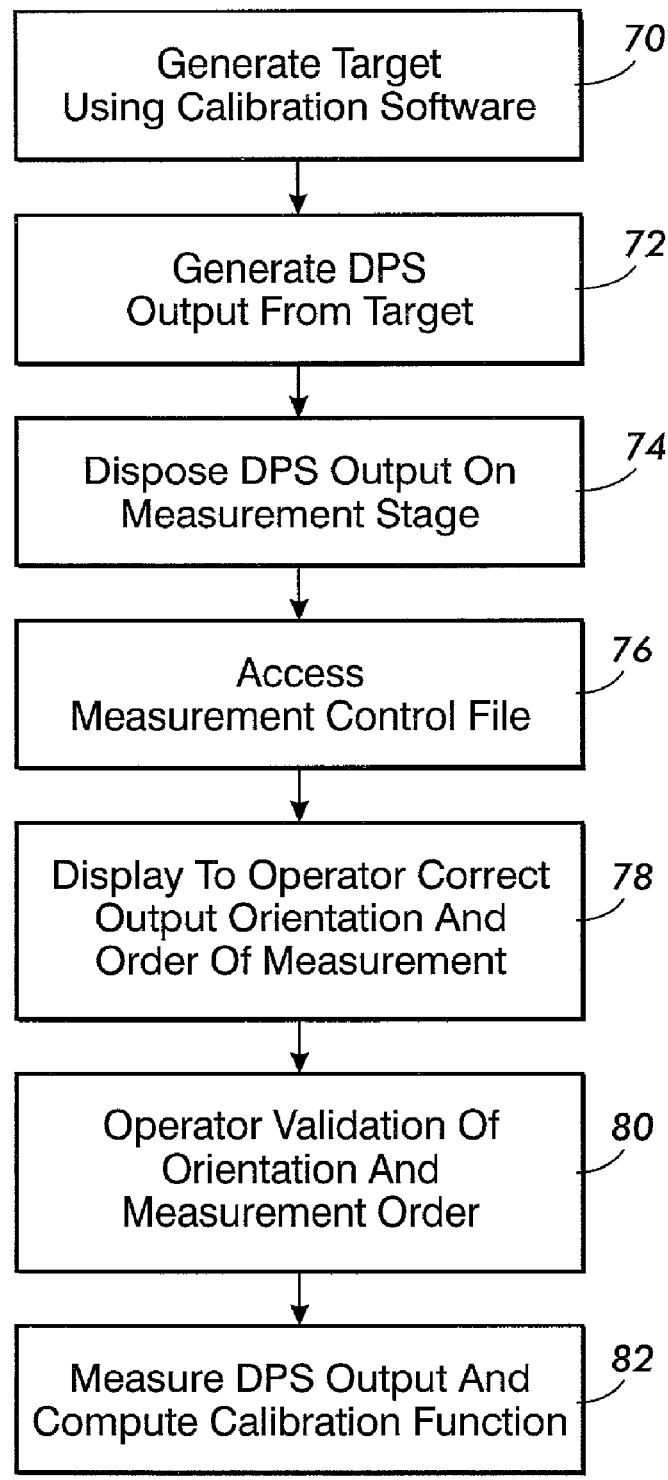
FIG. 4 is a flowchart illustrating the steps of an alternative embodiment of the invention for validating an orientation and a measuring order prior to measurement execution for computing a calibrating function; and, FIG. 5 is a flow chart illustrating another alternative embodiment of the invention for validating an orientation and a measuring order prior to measurement execution for computing a calibrating function.

With reference to FIG. 4, an alternative embodiment is illustrated which prevents a mismatch at the measurement stage.

Use of Softproofing to Assist in Correct Target Orientation at the Measurement Stage Target generation 70, DPS patch output 72 and disposition 74 of the output patches on the measurement stage are the same as in the above methods. When the user measures a target on an automated measurement stage such as the Gretag® Spectrolino® Spectroscan he first has to select a control chart that corresponds to the target being measured. The chart menu typically contains a long list of control charts created for different custom targets. A novice user may have difficulty selecting the correct chart from this list. In addition, once the user has selected a chart, the target page itself may be oriented in multiple different orientations on the measurement stage. To aid the user in both these steps of control chart selection and target orientation on the stage, this embodiment of the of the invention proposes softproofing to display the target layout corresponding to one or more control chart thumbnail representations. The user can then select the chart whose thumbnail matches the print he is about to measure. The thumbnail can also provide the orientation for the target on the measurement stage. This will reduce the burden on the user and decrease occurrences of incorrect layouts and measurements.

Note that three things need to be known in one place in order to be able to produce the correct thumbnails/images indicating target orientation on the stage: (1) the target layout and the order in which the device control values are placed in that layout, (2) the expected colors corresponding to the device control values used in generating the target; and (3) the device control chart options that specify the order of measurements on the stage. The idea could be implemented in a number of different ways. The characterization software could convey (1) and (2) to the measurement workstation (which then uses it with (3) which it has). Alternately, the measurement stage could convey (3) to the characterization software before the target generation step and it could use that with (1) and (2), which it generates (standard network protocols such as ftp may be used to send this information). Or alternately yet, the characterization software could itself generate (1), (2) and (3), which is the embodiment that is illustrated in FIG. 4.

At the time of generation 70 of the target, the characterization software has knowledge of the target layout, the device control values for the target patches, and their placement in the layout 76. Corresponding expected color values can be obtained by using an existing characterization profile/model of the printer, or a similar printer. If the characterization software also has some knowledge of the measurement instrument, it can generate a control chart for the device that controls the measurement order for the instrument. If the chart format supports it, the RGB values corresponding to the expected colors in the target can be embedded in the control chart so that when the measurement workstation displays these RGB values it corresponds to the correct orientation of the target on the measurement stage.

There are two sections; one that specifies layout, and other optional section that contains colors (in R, G, B) to be "poured" into the given layout for display on the screen when the user is instructed to align the measurement stage with the target. It would be beneficial at the time of this alignment to have the display on the screen which shows: (a) the target with colors closely matching the color in the user's printed target and also (b) the desired orientation of the target on the measurement stage. This could be done for instance by displaying 78 a color graphic showing the chart on the measurement stage with the correct orientation for the target as shown schematically in FIG. 2.

If the chart format does not support this feature, the functionality can still be provided by generating an alternate image/thumbnail that shows the physical placement of the target on the measurement stage and providing both this image and the control chart file to the measurement workstation.

The operator can select the proper thumbnail for effective validation 80 of output orientation and measurement order and calibration is completed 82.

Figure 5:
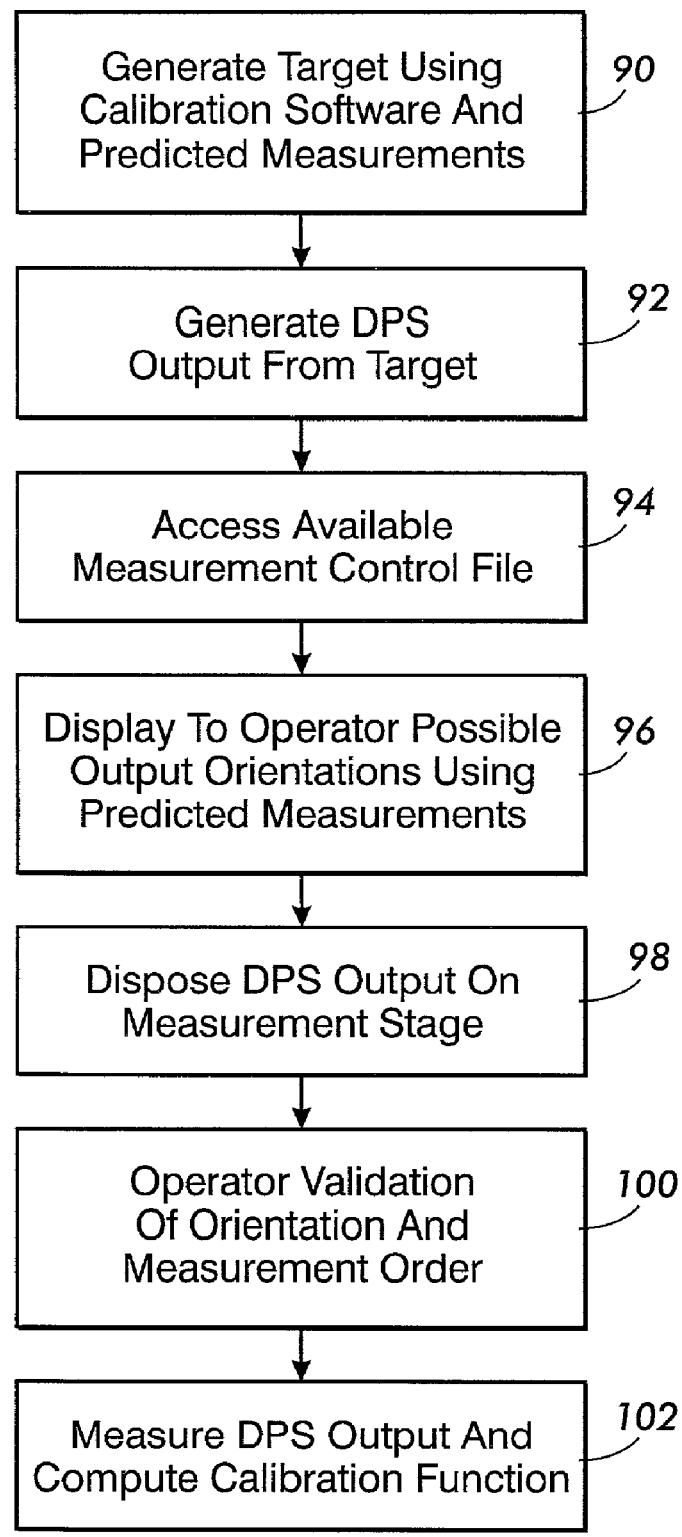

An alternate embodiment of the invention is shown in FIG. 5, in which along with the target generated for printing, a set of predicted values for the corresponding patches (in the sequence for "correct" measurement) are generated 90. Concurrently with DPS output generation 92, the predicted values are conveyed to the measurement station, where they are used 94 with the control files available at the measurement station to generate 96 visual representations of the target as it would have to be placed 98 on the measurement stage to produce the predicted values in the correct sequence. Note using the number of measurements, a number of invalid control files may be eliminated, and the operator may have to eliminate additional ones by checking 100 that the target cannot be physically oriented in the orientation shown in the visual representation. If in addition to the predicted values for the target patches, layout information is also included and provided to the measurement station, the layout information can be used with the available control files to automatically determine one or more that will work. The corresponding visual representation may then be provided to the operator of the measurement station to assist in correctly orienting the target for computing 102 the calibration function.

The invention has been described with reference to preferred embodiments, obviously alterations and modifications will occur to those of ordinary skill in the art. It is our intention to include all such equivalents within the scope of the invention.

Having thus described our invention, we now claim:

1. A method of calibrating a document processing system (DPS) comprising steps of:
   providing a target comprised of a plurality of target elements to the DPS; generating a DPS output from the target, wherein the DPS output includes a plurality of output elements corresponding to the target elements;
   measuring the DPS output relative to the target for computing a calibrating function for the DPS; and,
   when the measuring indicates a mismatch in relative orientation between the target elements and the output elements, reordering the measured output elements for matching the relative orientation of the measured output elements to the target elements whereby the computing of the calibrating function is done without having to re-measure the output elements.

2. The method as defined in claim 1 wherein the measuring indicating a mismatch is relative to a sequential order of measuring of target elements defined by the measuring step, or relative to a position flipping of the DPS output from the provided target.

3. The method as defined in claim 1 wherein a predetermined value for the measuring is associated with the target, and the mismatch is indicated when the computing of the calibrating function exceeds a threshold error from the predetermined value.

4. The method as defined in claim 3 wherein the reordering comprises a confirmation by a DPS operator.

5. The method as defined in claim 4 wherein the confirmation by the DPS operator comprises selecting an order for the measuring.

6. The method as defined in claim 5 wherein the selecting is made from a set of alternative visual layouts.

7. The method as defined in claim 3 wherein the reordering comprises determining a minimum error value in the computing of the calibrating function.

8. The method as defined in claim 7 wherein the minimum error value is computed from a set of likely orderings of the output elements relative to the target elements.

9. The method as defined in claim 3 wherein the predetermined value associated with the target is computed from a prior calibration of the DPS.

10. The method as defined in claim 3 wherein the predetermined value associated with the target is computed from a model for the DPS.

11. The method of claim 1 executed in a xerographic environment.

12. A method for validating an output used in calibrating a document processing system (DPS), comprising the steps of:
    generating a calibration target for assessing a range of outputs of the DPS, the target comprising a plurality of target elements and element orientation information representing a physical layout of said target elements in a DPS output;
    generating the DPS output in accordance with the calibration target;
    measuring characteristic values corresponding to the individual target elements from the DPS output;
    identifying a mis-ordering of the measurements of the target elements in the DPS output from a desired order of measurement; and,
    re-ordering the measurement of the target elements of the DPS output in accordance with the desired order thereby facilitating use of the measurements without requirement of re-measurement.

13. The method as defined in claim 12 wherein the identification is based on determining a difference between a predicted output value corresponding to a target element and a measured output value for the corresponding elements in the DPS output.

14. The method as defined in claim 13 wherein the determining is made visually by an operator of the DPS.

15. The method as defined in claim 14 wherein the re-ordering is confirmed visually by the operator.

16. The method as defined in claim 13 wherein the determining comprises a computing of an error value.

17. The method as defined in claim 16 wherein the re-ordering is determined so as to minimize the error value.

18. The method as defined in claim 13 wherein the predicted value associated with the target is computed from a prior calibration of the DPS.

19. The method as defined in claim 13 wherein the predicted value associated with the target is computed from a model for the DPS.

20. A calibration system for a document processing system (DPS) comprising:
- an output of the DPS generated from a calibration target including a selected sequence of target elements, wherein the output includes a corresponding sequence of output elements to the target elements;
- a controller including a sensor for sensing a characteristic of the output elements for computing a calibrating function between the output and the calibration target based upon a comparison of target elements and corresponding output elements, and wherein the controller includes an error identifier indicating a mismatch between the selected sequence of target elements and corresponding sequence of output elements attributable to a mis-ordering of the sensing of the output elements relative to the selected sequence of target elements for the comparison; and,
- an adjuster for re-ordering the output for the comparison whereby the computing is based on a correct sequencing of the output elements and the target elements.

21. The system as claimed in claim 20 wherein the adjuster comprises a visual display of alternative sequencing orders of the output to match the calibration target, and wherein a user selects one of the alternative sequencing orders for validating the comparison.

22. The system as claimed in claim 20 wherein the adjuster comprises a computation of a minimal error value for the computing of the calibrating function indicative of a correct sequencing between the output elements and the target elements.

23. A method of calibrating a DPS from a predetermined target to expedite computing a calibrating function for the DPS from a DPS output based on the target, comprising the steps of:
- providing the target to the DPS and associating the target with a corresponding measuring process;
- generating an output from the DPS;
- disposing the output to be measured in a selective position in a measuring device for the computing of the calibrating function;
- identifying a mis-ordering of the measurements of the target in the DPS output from a desired order of measurement;
- based on the identified mis-ordering, providing to a user of the DPS a representation of the correct corresponding measuring process including a desired position of the output orientation and order of measurement;
- visually validating by the user of the selected position relative to the representation;
- measuring the output relative to the target; and,
- computing the calibrating function from the measuring.

24. The method as defined in claim 23 wherein the providing the representation of the corresponding measuring process includes imaging for the user the selective position of the disposed output that provides measurements in a correct order with respect to the DPS calibration process.

25. The method as defined in claim 23 further including redisposing the output in response to the providing of the representation of the measuring process whereby the redisposing matches the output to the corresponding measuring process.

26. The method as described in claim 23 wherein the representation of the measuring process provided to the user is a visual image presented on a display derived from a prior characterization of the DPS.

27. The method as described in claim 23 wherein the representation of the measuring process provided to the user is a visual image presented on a display derived from a model of the DPS.

28. The method as described in claim 23 wherein the providing the representation further includes providing control commands for the measuring of the output, and wherein the providings of the representation and control commands are associated in a control file for concurrent execution with the generating of the output.

29. A method of calibrating a DPS from a predetermined target to expedite computing a calibrating function for the DPS from a DPS output based on the target, comprising the steps of:
- generating an output from the DPS having a plurality of patches corresponding to the target;
- providing to a measuring device predicted measurement values for each patch on the output;
- providing to a user of the DPS a visual representation corresponding to at least one control file available at the measuring device for measuring the output, including:
  - extracting a subset of control files which are available at the measuring device and highly probable to include a correct output layout and measurement order for presentation to the user;
- selection by the user of a control file for which the visual representation matches the output;
- disposing the output in the measuring device to match the visual representation;
- measuring the output with the selected control file; and,
- computing the calibrating function from the measuring.

30. The method as described in claim 29 wherein the extracting is performed by examining a total number of predicted measurement values from the sending step and selecting control files for the measuring that are consistent with the total number.

31. The method as described in claim 29 wherein: the providing predicted measurement values further comprises sending target layout information from the DPS to the measuring device; and, the extracting is performed by selecting only those control files that are consistent with the target layout information.

* * * * *